US008866872B2

(12) United States Patent
Couse (10) Patent No.: US 8,866,872 B2
(45) Date of Patent: Oct. 21, 2014

(54) CONFERENCING AND COLLABORATION SYSTEM AND METHODS THEREOF

(75) Inventor: Peter Francis Couse, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 649 days.

(21) Appl. No.: 13/134,923

(22) Filed: Jun. 21, 2011

(65) Prior Publication Data

US 2012/0327175 A1    Dec. 27, 2012

(51) Int. Cl.
*H04N 7/14*    (2006.01)
*H04L 12/18*    (2006.01)

(52) U.S. Cl.
CPC ......... *H04L 12/1818* (2013.01); *H04L 12/1827* (2013.01)
USPC .................................... 348/14.08; 348/14.02

(58) Field of Classification Search
CPC ......... H04N 7/14; H04N 7/141; H04N 7/142; H04N 7/144; H04N 7/147; H04N 7/148; H04N 7/15; H04N 7/152; H04N 7/155; H04N 7/157; H04L 12/1818; H04L 12/1827
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| | | | |
|---|---|---|---|
| 4,686,698 A * | 8/1987 | Tompkins et al. | 348/230.1 |
| 6,317,777 B1 * | 11/2001 | Skarbo et al. | 709/204 |
| 2005/0034079 A1 * | 2/2005 | Gunasekar et al. | 715/753 |
| 2006/0248149 A1 * | 11/2006 | Kraft et al. | 709/206 |
| 2008/0231687 A1 * | 9/2008 | Baird et al. | 348/14.09 |
| 2009/0113022 A1 | 4/2009 | Quoc et al. | |
| 2011/0154204 A1 * | 6/2011 | Narayanaswamy | 715/727 |
| 2012/0062688 A1 * | 3/2012 | Shen et al. | 348/14.03 |
| 2012/0278408 A1 * | 11/2012 | Seferian et al. | 709/206 |

FOREIGN PATENT DOCUMENTS

| | | |
|---|---|---|
| WO | WO 2004/0073241 A2 | 8/2004 |
| WO | WO 2008/0036128 A1 | 3/2008 |
| WO | WO 2009/0089585 A1 | 7/2009 |

* cited by examiner

*Primary Examiner* — Khai N Nguyen (57) ABSTRACT

A conference device and an application for enabling geographically dispersed individuals to collaborate with one another are disclosed herein. Communication protocols can be used to invoke actions within the conference device and the application. Files can be transferred between the application and conference device. The application can remotely control connected conference devices. The application along with the conference device can offer a range of capabilities from multi-party audio conferencing to three hundred and sixty degree microphone pick-up for in-room participants. Multi-party video conferencing capabilities and in-room presentation displays via a built-in video interface to the in-room projector or monitor are provided. The conference device can include features such as Bluetooth™ or other connection that enables detection of wireless devices when meeting participants are present by virtue of their mobile device being within range.

19 Claims, 4 Drawing Sheets

CONFERENCING AND COLLABORATION SYSTEM AND METHODS THEREOF

TECHNICAL FIELD

This disclosure generally relates to conferences, and more particularly, to a conference and collaboration application that supports features for enabling geographically dispersed individuals to communicate with one another.

BACKGROUND

Organizations today use conferencing and collaboration solutions to hold meetings with several parties in multiple geographic locations. Features typical of these conferencing and collaboration solutions include the ability to schedule a conference with both internal and external parties. These conferences use audio and video conferencing, text chat, application sharing and remote desktop sharing via an Internet connection. Audio conference bridge capabilities are provided with control over individual callers. Conference and collaboration solutions allow the sharing of a presentation with remote parties, sharing the display of a specific application with remotes parties and sharing a desktop display with remote parties.

White-boarding capabilities with conference and collaboration solutions allow participants to annotate documents being shared with participants, for example, slides and text documents. These solutions also allow the conference moderator to pass control of the presentation such that the remote party that has gained control can direct what is being displayed to all conference participants. Private chats between conference attendees are available and the ability to see who has joined the conference and who is currently speaking is provided by these solutions. Conference and collaboration solutions poll conferencing participants to solicit feedback as well as provide recording capabilities.

Within conference and collaboration solutions, a moderator starts a meeting by arriving at the meeting room at the scheduled time and finding the number within their email or calendar application that needs to be dialed to access the audio conference bridge. The moderator then manually dials the number on the conference phone in the room. Once the audio conference bridge solution answers the call, the moderator manually enters their conference identification number and passcode using the conference phone dial pad. A projector or monitor video cable available in the room is plugged into their laptop such that they can display the presentation material to the in-room participants.

The moderator then logs into their laptop and accesses the collaboration session by either launching the application on their computer or by logging into the service website. Once in the conference and collaboration application or service, the moderator logs into the prescheduled meeting by entering their conference identification number and passcode. The moderator enables video conferencing with any external parties who are video conference enabled. Sometimes, this is a completely separate video conferencing system that has no integration with the conference and collaboration application. The presentation material is opened to be shared with internal and external participants and is then shared with external participants via a menu item.

As shown, this type of conferencing and collaboration solution initiating a conference is manually intensive and time consuming. With these separate solutions, the typical conference room meeting that includes outside parties involves connecting a laptop to a projector through a local connection, accessing and opening the presentation material on the laptop and thereafter, getting it to display on the attached display device, which can include having to adjust display settings. During the meeting, the moderator also calls or answers external meeting participants who are dialing in for the meeting and then setting up a video conference with the external participants on the video conferencing system. This consumes time and effort before the meeting can be productive. This is compounded by the fact that meeting room users are infrequent users of the systems provided in the room and are therefore not proficient in the use of these systems.

A conferencing and collaboration system and methods thereof aimed at simplifying the initiation of a meeting in a conference room while reducing the time and effort required is therefore needed. These, as well as other related advantages and features, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The data structures and code described in this detailed disclosure are typically stored on a non-transitory computer-readable storage medium, which can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed disclosure section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The present disclosure relates to conferences. More specifically, this disclosure relates to a conferencing and collaboration system and methods thereof. In one illustrative embodiment, Voice over Internet Protocol (VoIP) conference devices that reside within meeting rooms and a conference and collaboration application are provided. By communicating with each other, the conference devices and the conference and collaboration application offer features for enabling geographically dispersed individuals and teams to collaborate with one another. Communication protocols are used to invoke actions within the conference device and the conference and collaboration application. The conference and collaboration application can remotely control conference devices. The application can also enable transfer of files between the application and the conference devices.

The conference and collaboration application along with the conference device can offer a range of capabilities from multi-party audio conferencing to three hundred and sixty degree microphone pick-up for in-room participants. Multi-party video conferencing capabilities and in-room presentation displays via a built-in video interface to the in-room projector or monitor can be provided. The conference device can include features such as detection of wireless devices when participants are present and providing this information to other conference devices. Many additional advantages of the present disclosure will become apparent to those skilled in the relevant art as provided for in the following description.

A typical environment for the conferencing and collaboration system will be described in FIG. 1. Thereafter, FIGS. 2 through 4 will provide exemplary flow charts depicting procedures used by the conference and collaboration apparatus and/or the conference devices within the system. While the term moderator is described throughout the present disclosure to describe a person who schedules meetings through the conference and collaboration application, those skilled in the relevant art will appreciate that other terms can be used, for example, an administrator or user.

The technology described herein can be implemented as logical operations and/or modules. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

Figure 1:
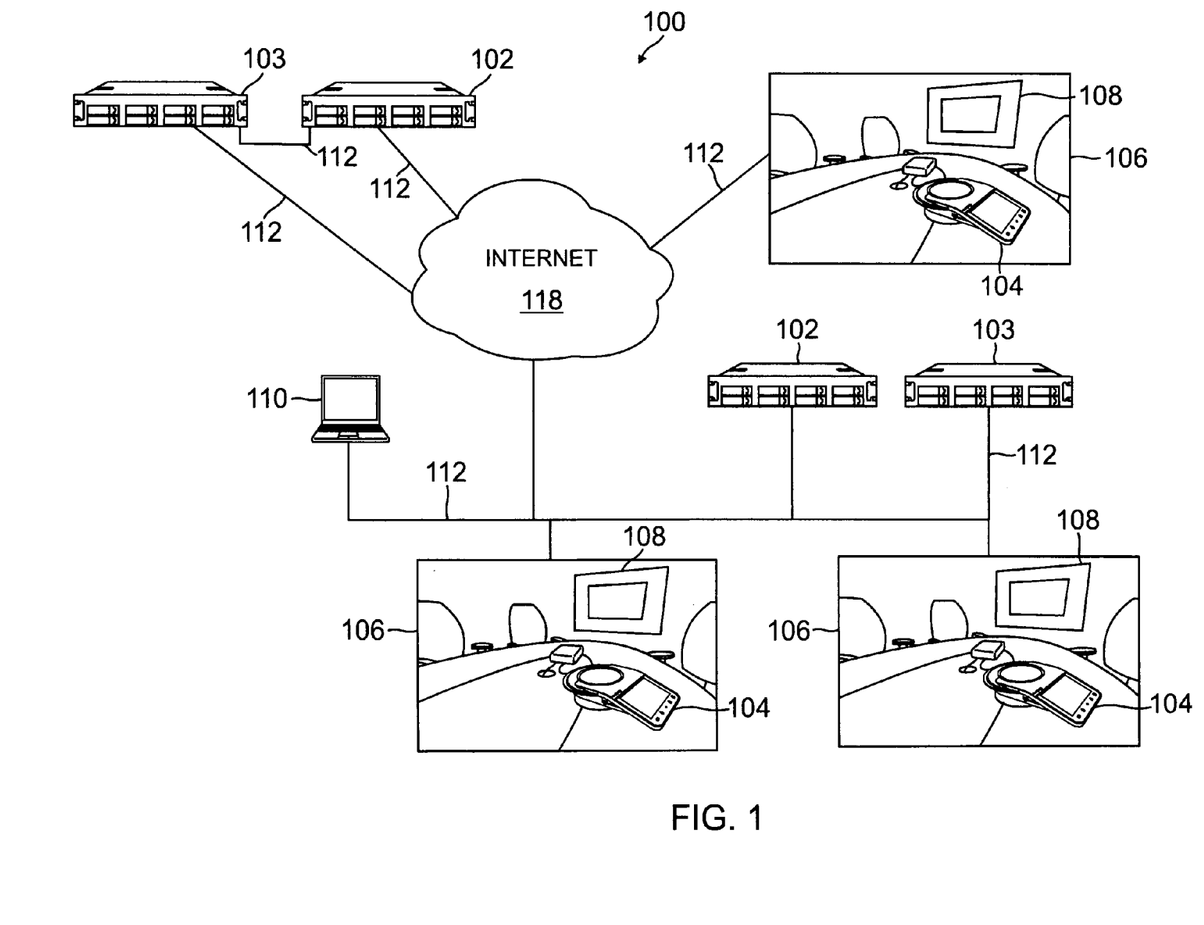
FIG. 1 is a block diagram depicting exemplary conference and collaboration applications in communication with conference devices in accordance with one or more aspects of the present disclosure.

Turning now to FIG. 1, a system 100 depicting exemplary conference and collaboration applications 102 in communication with conference devices 104 in accordance with one or more aspects of the present disclosure is provided. Generally described, the system 100 includes a conference and collaboration application 102 and conference devices 104 communicating through a local area network (LAN) 112. The system 100 shown represents one embodiment and should not be construed as the only working environment for the conference and collaboration application 102 and the conference devices 104.

The conference and collaboration application 102 can operate on a traditional server or web server. The server can include an operating system and software instructions, ROM, RAM, at least one processor, a network interface and data storage. The server can process requests from a user device 110, conference device 104 or any other component within the system 100. The server can typically handle high volumes of transactions and large amount of queries for communication and data processing. RAM and ROM are used to support the program codes that are operated by the processor. The memory can be in a form of a hard disk, CD ROM, or equivalent storage medium. The processor can support the authentications such as communications from external data servers, as well as allowing for anonymous transactions and general data encryption.

The data storage can include hard disk magnetic or optical storage units, as well as CD ROM, CD RW or DVD ROM and flash memory such as compact flash and secure digital cards. The data storage contains databases used in the processing of transactions as well as storing meeting details between the devices 104. Conventional Ethernet technology or internal or external modems can serve as the network interfaces. A cable or DSL modem can be used as a network interface. While the above embodiment describes a single computer system acting as the server for the conference and collaboration application 102, the functionality can be distributed over multiple computing systems. The databases can also be distributed over a cloud computing environment known to those skilled in the relevant art. In one embodiment, the server is configured in a distributed architecture, wherein the databases and processors are housed in separate units or locations. While more than one conference and collaboration application 102 is provided, those skilled in the relevant art will appreciate that fewer or more of these devices can be placed within the system 100. The application 102 can be maintained remotely through the Internet 118 as depicted at a top portion of FIG. 1, more directly as shown on the right portion or both.

The server for the conference and collaboration application 102 can be connected to other components within the system 100 through a LAN 112. While a LAN 112 has been used, those skilled in the relevant art will appreciate that other types of networks can be used, for example, the Internet 118, intranet, wide-area network (WAN), personal-area network (PAN), campus-area network (CAN), metropolitan area network (MAN), global-area network (GAN), virtual private network, or any other type of network supporting communication between devices described herein. The LAN 112 can include both wired and wireless connections, including optical links. Data and other information can be distributed from the application 102 to and from the conference devices 104.

The conference and collaboration application 102 can function with a VoIP system 103. The VoIP system 103 is utilized to route audio and video from the conference devices 104 and the conference and collaboration application 102. Communication between the conference devices 104, the VoIP system 103 and the conference and collaboration application 102 can occur via the LAN 112.

Conference calls between the conference devices 104 can be designed so that the conference and collaboration application 102 can cause the moderator's conference device 104 to call the other participants directly and conference them together or the conference and collaboration application 102 can cause the participant's conference device 104 to call the moderator's conference device 104 and add them to the conference on the moderator's conference device 104. These calls are setup and routed by the VoIP system 103 for the conference and collaboration application 102. Alternatively, the moderator can choose to utilize the audio conference bridge capability provided as part of the conferencing and collaboration application 102. In this case, the conference and collaboration application 102 can cause each of the conference devices 104 to dial into the assigned conference bridge for the scheduled meeting.

For participants who are not connecting via a conference device 104, a meeting invitation is sent by the conference and collaboration application 102 that includes a phone number and conference identification number that participants would dial to be connected into the audio conference bridge that is being used for the conference. In this case, the VoIP system 103 would route participants calling into the conference bridge to the conference and collaboration application 102. The conferencing and collaboration application 102 can support live streaming or broadcasting of conference calls as well via the Internet 118, enabling a larger audience access to the call without dialing into a bridge. The conference and collaboration application 102 can be a captive application that is a shared resource within a company or organization or it can be provided as a hosted service offered via the Internet 118 that is paid for on a pay-per-use basis.

With reference to the conference devices 104, a processor for implementing logic, memory, a display, and an input device can be provided in each. A system bus can be used for video and audio data as well as propagating signals for processing the video and audio. A HDMI type A interface can provide the ability to drive an external high resolution projector or monitor 108 in the room 106. The conference device 104 typically includes both volatile memory and non-volatile memory. The conference device 104 can include an operating system (OS) stored in the RAM, which can manage programs.

As shown in FIG. 1, a user device 110 can be connected through the LAN 112. The user device 110 can include a cell phone, personal digital assistant (PDA), stationary personal computer, IPTV remote control, web tablet, laptop computer, pocket PC, a television set, mobile IP device or the like. The user device 110, which can be operated by a moderator, can be used to schedule a conference by accessing the conference and collaboration application 102. The user device 110 can be connected to the LAN 112, the Internet 118 or both. A conference and collaboration application 102 can also be provided to host the conference via the Internet 118 as shown in the top portion. The conference and collaboration application 102 can operate on a server, similar to the one described above.

While numerous components have been described within the system 100 above, those skilled in the relevant art will appreciate that fewer or more components can be used. The system 100 can be integrated with multiple conference devices 104 in different locations to perform actions such as uploading presentation material to the devices 104 for display, pass presentation navigation actions from a moderator operating a conference device 104 to remote conference devices 104, pass navigation control from a moderator of a conference device 104 to remote devices 104 and pass files uploaded by a remote user device 110 to connected devices 104.

By combining a conference and collaboration application 102 and conference devices 104, meetings can be automatically setup by the conference and collaboration application 102 by remotely controlling the conference devices 104. The conference and collaboration application 102 can cause the conference devices 104 to dial into the audio conference bridge and connect remote video conferencing participants. The conference and collaboration application 102 can then upload presentation materials to conference devices 104 for display in the rooms 106. In addition, the conference device 104 can provide local information to the conference and collaboration application 102 that can be displayed to remote participants. More details describing these actions will be provided below.

Figure 2:
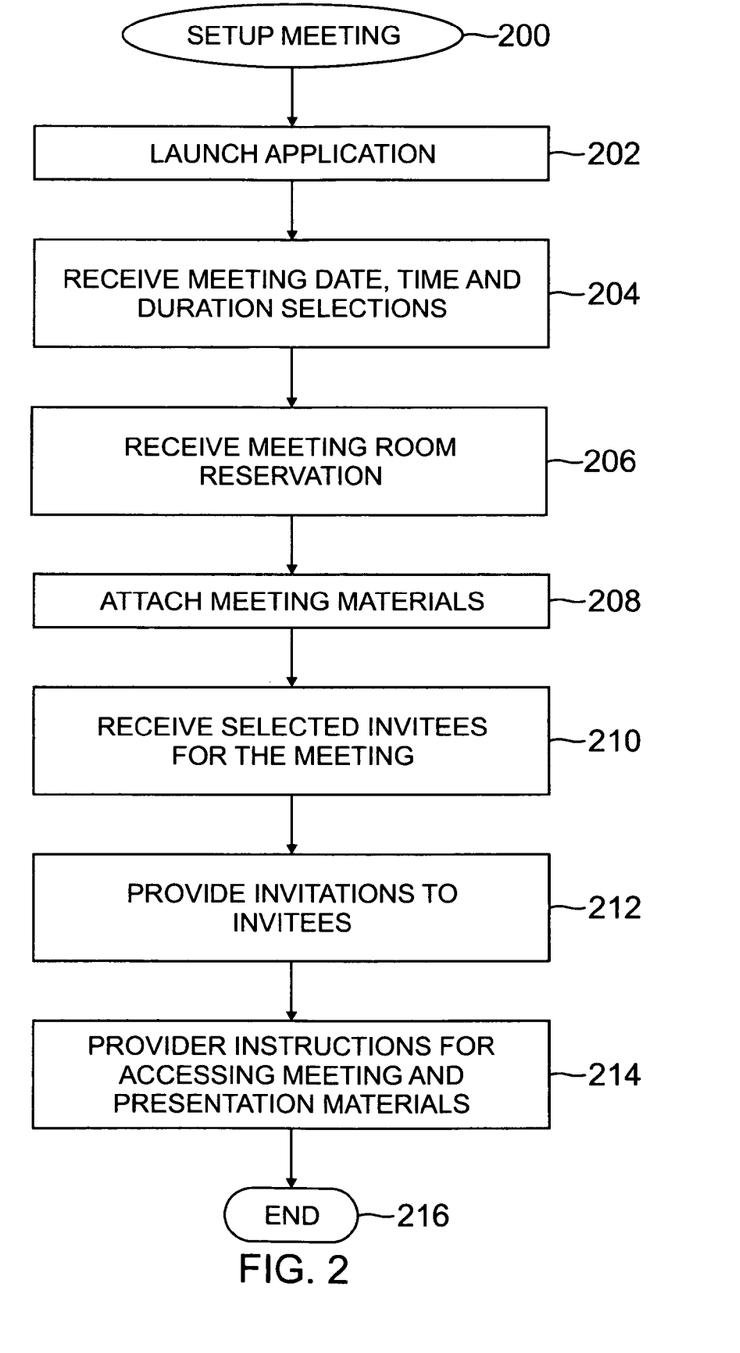
FIG. 2 is a flow chart showing illustrative procedures for establishing a meeting in accordance with one or more aspects of the present disclosure.

FIG. 2 is a flow chart showing illustrative procedures for establishing a meeting in accordance with one or more aspects of the present disclosure. Fewer or more procedures can be used and are not limited to those disclosed in the flow chart. The processes can begin at block 200. At block 202, a user is able to set up a meeting through their user device 110 by launching the conference and collaboration application 102 or by accessing the service online. Scheduling of a meeting can be performed directly within the conference and collaboration application 102 or within the user's calendar application, such as Microsoft® Outlook or Lotus® Notes. When the user schedules the meeting through their calendar application, the conference and collaboration application 102 can interface with the calendar application through available Application Programming Interfaces (APIs) to enable it to be notified of new calendar entries and their details. A plug-in for the calendar application can also be provided that incorporates a menu item to the calendar application for uploading presentation material into the conference and collaboration application 102 for use in the meeting. In one embodiment, the meeting can be setup using a conference device 104.

Initially, the user enters in a meeting date, time and duration through one of the methods described above. At block 204, the application 102 can receive the meeting details. The user of the application 102 or moderator can also reserve a meeting room 106 that has a conference device 104 in it. The application 102 can allow the moderator or system administrator to pre-configure an association between the meeting rooms 106 within the organization and the conference devices 104 contained within them. Typically the conference devices 104 can have an extension number that is stored within the VoIP system 103 it is connected to. The VoIP system 103 can be queried by the application 102 to determine the IP address of conference devices 104 such that it can communicate with them. In this way, the application 102 is able to determine and communicate with the conference device 104 in the scheduled meeting room 106.

At block 206, the application 102 can receive a meeting room 106 reservation for the moderator of the meeting to use. The application 102 can also enable the moderator to reserve a meeting room 106 that contains a conference device 104 for one or more participants being invited. This can be used when one or more of the participants are in another office at a different geographic location within the organization. The conference and collaboration application 102 can use this information to distribute presentation materials to the conference devices 104 at both locations and to automatically initiate the conference at both locations when it is time for the meeting to start.

At block 208, the moderator can attach meeting materials, if desired. These meeting materials can be provided in any format useable by the conference devices 104. In one embodiment, the application 102 can reformat these materials if they cannot be properly displayed on the devices 104. Display information for each of the devices 104 can be maintained by the VoIP system 103 or alternatively, the application 102. The moderator can select invitees to attend the meeting. At block 210, the application 102 can receive information about the invitees who can be associated with conference devices 104.

At block 212, the conference and collaboration application 102 can provide invitations to the invitees that were selected by the moderator. In one embodiment, invitations can be sent via email. The emails can be sent by the user's calendar application with text being supplied by the application 102 or the application 102 can provide a lookup email address feature itself such that a corresponding email address can be found with a name received by the application 102. Alternatively, invitations can be sent through a text message or the like to the invitees. The application 102 can provide instructions within the email to invitees not connecting via a conference device 104 including information required to access the meeting and any presentation materials at block 214. In one embodiment, the application 102 can include any dial-in numbers for the audio conference bridge as part of the instructions. The processes can end at block 216.

Figure 3:
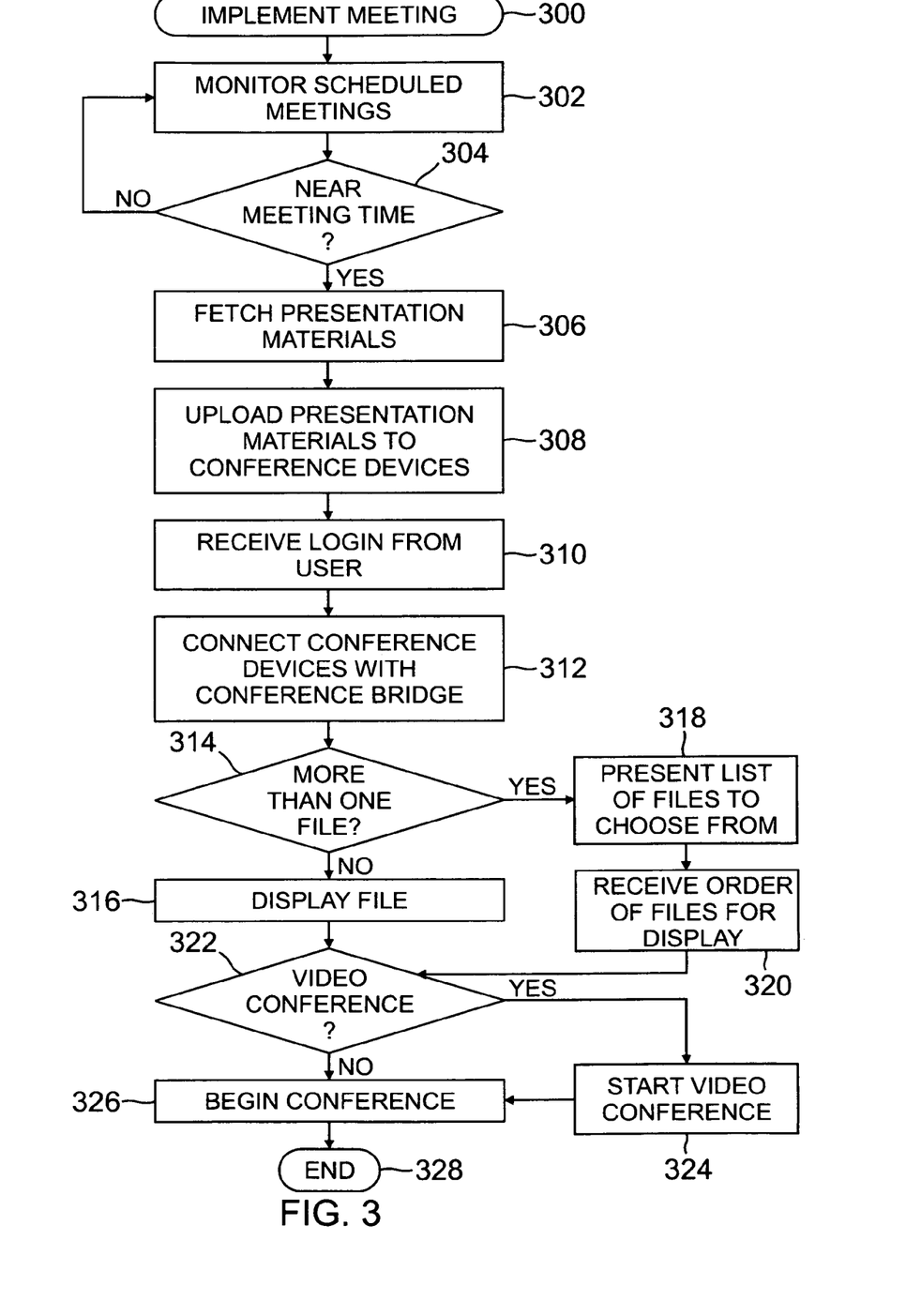
FIG. 3 is a flow chart showing illustrative procedures for implementing the meeting in accordance with one or more aspects of the present disclosure.

Referring now to FIG. 3, a flow chart showing illustrative procedures for implementing a meeting in accordance with one or more aspects of the present disclosure is provided. While one embodiment showing procedures for setting up the meeting was described above, those skilled in the relevant art will appreciate that the moderator can schedule meetings through other ways. The processes for implementing the meeting can begin at block 300. At block 302, the conference and collaboration application 102 can monitor a list of scheduled meetings.

At decision block 304, the application 102 can determine whether a meeting is to commence. When the established meeting does not occur within a relatively close period of time, the application 102 can continue to monitor the scheduled meetings at block 302. As the time for a meeting approaches, at block 306, the conference and collaboration application 102 can fetch the presentation materials that were uploaded by the user. In one embodiment, the presentation materials are fetched five minutes before the meeting is scheduled to start.

At block 308, the application 102 can upload the presentation materials to the conference devices 104 in the scheduled meeting rooms 106 so that they are ready to be displayed to both in-room and external participants. In one embodiment, the conference devices 104, when enabled, can display the presentation materials to in-room participants via the projector or monitor 108 of the room 106.

At block 310, when the user or moderator of the meeting arrives, they can log into a conference device 104 in the meeting room 106. In one embodiment, the moderator can provide their network credentials by entering their extension number or a username and a passcode. Alternately, the conference device 104 can detect the user's presence in the room 106 using a built-in Bluetooth™ interface to automatically log in the moderator based on a unique device identifier, for a Bluetooth™ device they are carrying, which had been stored previously within the application.

At block 312, when the moderator logs into the conference device 104, the conference and collaboration application 102 can connect the conference devices 104 to the audio conference bridge without any user intervention. At decision block 314, the conference and collaboration application 102 can determine whether the presentation for display includes more than one file. When only one file is provided, at block 316, the file can be displayed on the conference devices 104. Alternatively, if more than one file is provided, the display on the conference device 104 operated by the moderator can provide a list of files at block 318. At block 320, and if more than one file was fetched for the meeting, the moderator can choose which file to display or an order for displaying the files. The conference device 104 operated by the moderator can provide white boarding capabilities where the presentation can be marked up on the device 104 and then communicated to other devices 104 by the conference and collaboration application 102.

At decision block 322, the application 102 can determine which conference devices 104 are capable of handling video. When the conference devices 104 are capable of performing a video conference, the conference and collaboration application 102 can start video conferencing between the conference devices 104 including those within local and remote rooms 106 at block 324. For devices 104 that do not have video capabilities, or those who do not want to implement video, they can still attend the conference via audio only. The application 102 can then begin the conference at block 326. Non-conferencing devices can also be implemented within the system 100 that can be provided both audio and video.

When the conference is over, the processes can end at block 328. In one embodiment, the conference and collaboration application 102 can be offered as a hosted conference and collaboration application 102 via the Internet 118. Because the conference and collaboration application 102 can cause the conference devices 104 to perform actions, many of the manual steps required with today's solutions can be automated. This can shorten the amount of time required to get a conference session started and eliminates many of the opportunities for error that exist with the current manual entry of information.

The conference and collaboration application 102 can determine if the remote locations are meeting rooms 106 that are equipped with conference and collaboration application aware conference devices 104. If so, the conference and collaboration application 102 can connect the conference devices 104 directly without utilizing its audio bridge. In this way, consuming an audio bridge port can be avoided making it available for other conference calls resulting in an overall reduction in the number of bridge ports required.

Figure 4:
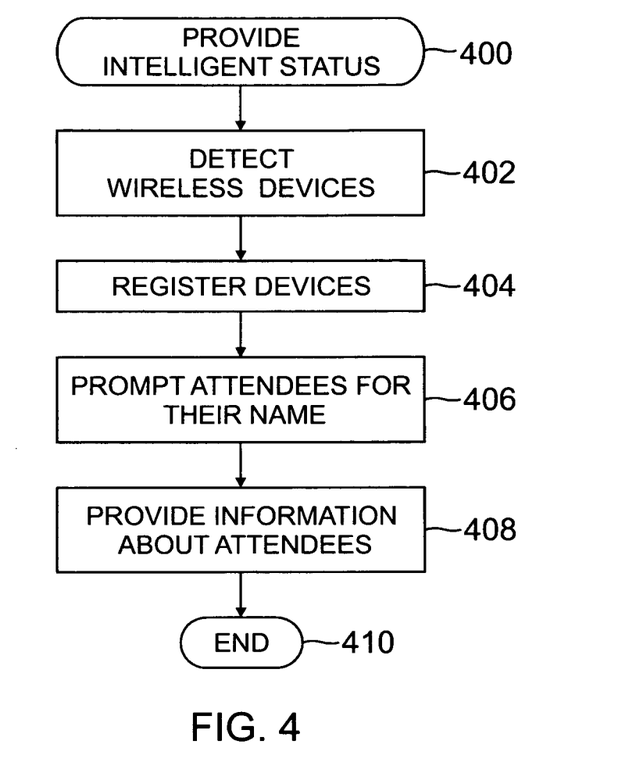
FIG. 4 is flow chart showing illustrative procedures for determining intelligent status information in accordance with one or more aspects of the present disclosure.

The conference and collaboration application 102 can provide additional features and benefits for the system 100. FIG. 4 is flow chart showing illustrative procedures for determining status information about a conference device 104 in accordance with one or more aspects of the present disclosure. Intelligent status information can be provided to the application 102 as well as other conference devices 104. The conference device 104 can pass information to remote participants via its graphical user interface (GUI). The processes can begin at block 400.

At block 402, the conference device 104 can detect wireless devices that are within range. This can be automatically derived based on Bluetooth™ enabled devices that are present around the conference device 104. When the conference device 104 detects that a user's device is present, it can include it in a list of attendees who are present in the room 106. At block 404, the conference device 104 can register these devices. In one embodiment, users would register their Bluetooth™ device to the conference device 104 by walking through a Bluetooth™ device identification process on the conference device 104.

After generating a list of attendees who are present in the meeting room 106 that the conference device 104 is located in, the attendees can be prompted for their name by the conference device 104 at block 406. The attendee can pick their device from the list and then enter their name. The identification of the user device along with their name can be passed to the conference and collaboration application 102 where it would be stored for use in identifying and displaying who is present in a meeting room 106. At block 408, the application 102 can provide information about the attendees to other conference devices 104. The processes can end at block 410.

Those skilled in the relevant art will appreciate that the conference and collaboration application 102 can be used to manage other information coming out of the conference devices 104. For example, when conference device microphones have been muted, the information can be provided to the application 102 and in turn, be passed to other conference devices 104. By maintaining and distributing this information, indicators to remote participants showing that the users in the conference room 106 have muted their microphones so they cannot be heard by remote participants is provided. Furthermore, indicators for video successfully being received by the conference device 104 and currently being displayed to in-room participants can be provided. This information can be provided to the remote parties indicating that the status of their video feed within the meeting room 106 has been successful. Information about participants in a meeting room 106 who choose to turn off a particular remote party's video feed from being displayed in the room 106 can also be provided to other devices 104. In addition, this can be communicated to that remote party via the conference and collaboration application 102.

In an organization, multiple meeting rooms 106 in different geographic offices can be equipped with the conference and collaboration application aware conference devices 104. In this environment, additional capability can be provided when the conference and collaboration application 102 recognizes that there are conference devices 104 that it can control at each end of a conference call. The additional capability that is provided includes uploading of presentation material from the conference and collaboration application 102 to all conference devices 104 in the conference call, displaying of a file on the moderator's conference device 104 causing it to display the same file on the remote conference devices 104 and providing navigation and editing within a presentation by the moderator of a conference device 104 causing the same navigation and editing to occur on remote conference devices.

Furthermore, the conference and collaboration application 102 can allow the moderator to walk through and modify a presentation displayed within the meeting room 106 as well as display it to remote participants via their remote conference devices 104. The moderator can pass navigation and editing controls of the presentation to a remote conference device 104. A remote participant can upload additional presentation files on their conference device 104 and also cause it to be uploaded to the moderator's conference device 104 via the conference and collaboration application 102 for display and editing.

In software implementations, computer software and/or data is stored on a machine readable medium as part of a computer program product, and is loaded into a computer system or other device or machine via a removable storage drive, hard drive, or communications interface. Computer programs, also called computer control logic or computer readable program code, are stored in a main and/or secondary memory, and executed by one or more processors, controllers, or the like to cause the one or more processors to perform the functions of the invention as described herein.

The figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present disclosure, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method implemented on a server for establishing meetings between conference devices used by individuals through a user device comprising:
    receiving details of a meeting;
    providing said details to said individuals attending said meeting;

directing said conference devices used by said individuals to dial into said meeting;
starting video conferencing with said conference devices used by said individuals that are video enabled for said meeting;
providing at least one presentation file to said conference devices used by said individuals for display thereon; and
providing local information of said conference devices to said server by detecting wireless devices that are within range of said conference devices, logging in users of said wireless devices and providing a list of said users to said server.

2. The method of claim 1, wherein receiving said details of said meeting comprises acquiring a date, time and duration of said meeting.

3. The method of claim 2, wherein acquiring said date, time and duration of said meeting comprises pulling said date, time and duration from a calendar application.

4. The method of claim 1, wherein providing said details to said individuals attending said meeting comprises sending room information where said conference devices are located.

5. The method of claim 1, wherein providing said details to said individuals attending said meeting comprises sending a uniform resource link of said at least one presentation.

6. The method of claim 1, wherein directing said conference devices used by said individuals to dial into said meeting comprises establishing an audio conference bridge and automatically connecting conference devices to said audio conference bridge.

7. The method of claim 1, wherein starting said video conferencing with said conference devices that are video enabled for said meeting comprises automatically connecting video between said conference devices used by said individuals.

8. The method of claim 1, comprising directing said user device to dial into said meeting and connecting video between said conference devices and said user device.

9. A conference apparatus comprising:
at least one processor; and
a memory operatively coupled to said processor, said memory storing program instructions that when executed by said processor, causes said processor to:
connect with a remote application;
establish a conference with at least one video conference participant having logged into said remote application;
provide local information of said conference apparatus to said remote application, wherein providing said local information comprises detecting wireless devices that are within range of said conference apparatus, logging in users of said wireless devices and providing a list of said users to said remote application.

10. The conference apparatus of claim 9, comprising a monitor, wherein said memory storing program instructions, when executed by said processor, causes said processor to receive at least one file from said remote application and display said at least one file on said monitor.

11. The conference apparatus of claim 9, comprising a monitor, wherein said memory storing program instructions, when executed by said processor, causes said processor to present a list of files from said remote application and display said list of files on said monitor for selection.

12. The conference apparatus of claim 9, wherein said memory storing program instructions, when executed by said processor, causes said processor to login a moderator.

13. The conference apparatus of claim 9, wherein said memory storing program instructions, when executed by said processor, causes said processor to connect with said at least one conference participant through a bridge port.

14. The conference apparatus of claim 9, wherein providing said local information of said conference apparatus to said at least one conference participant comprises providing whether said conference apparatus is muted.

15. The conference apparatus of claim 9, wherein providing said local information of said conference apparatus to said at least one conference participant comprises providing a video link status.

16. A system comprising:
a video conference and collaboration application in communication with a plurality of conference devices;
wherein a moderator uploads presentation materials to said video conference and collaboration application for display on said plurality of conference devices, said conference and collaboration application distributing said presentation materials to said plurality of conference devices based on actions of said moderator operating a conference device, said plurality of conference devices providing local information to said conference and collaboration application by detecting wireless devices that are within range of said conference devices, logging in users of said wireless devices and providing a list of said users to said conference and collaboration application.

17. The system of claim 16, wherein modifications to said presentation materials made on said conference device operated by said moderator are propagated to said plurality of conference devices.

18. The system of claim 16, wherein said plurality of conference devices are geographically dispersed.

19. The system of claim 16, wherein said conference and collaboration application is operated on a traditional server.

* * * * *